US011295305B2

(12) United States Patent
Wardman et al.

(10) Patent No.: US 11,295,305 B2
(45) Date of Patent: Apr. 5, 2022

(54) IDENTIFYING DOMAINS FOR EVALUATION DURING TRANSACTION PROCESSING

(71) Applicant: PayPal, Inc., San Jose, CA (US)

(72) Inventors: Bradley Wardman, Phoenix, AZ (US); Jakub Burgis, Scottsdale, AZ (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/694,325

(22) Filed: Nov. 25, 2019

(65) Prior Publication Data

US 2021/0158349 A1    May 27, 2021

(51) Int. Cl.
*G06Q 20/40* (2012.01)
*G06Q 20/32* (2012.01)
*G06Q 20/04* (2012.01)
*G06Q 30/06* (2012.01)
*G06Q 20/20* (2012.01)
*G06Q 20/12* (2012.01)

(52) U.S. Cl.
CPC ............. *G06Q 20/40* (2013.01); *G06Q 20/04* (2013.01); *G06Q 20/12* (2013.01); *G06Q 20/20* (2013.01); *G06Q 20/3224* (2013.01); *G06Q 30/06* (2013.01)

(58) Field of Classification Search
CPC ........ G06Q 20/40; G06Q 20/12; G06Q 20/04; G06Q 20/3224; G06Q 20/20; G06Q 30/06

USPC ........................................................... 705/44
See application file for complete search history.

(56) References Cited

U.S. PATENT DOCUMENTS

| 7,653,577 | B2 | 1/2010 | Warner | |
|---|---|---|---|---|
| 7,970,701 | B2 * | 6/2011 | Lewis | G06Q 20/3829 705/38 |
| 2008/0140442 | A1 * | 6/2008 | Warner | G06Q 30/0185 705/26.41 |
| 2011/0225076 | A1 | 9/2011 | Wang et al. | |

* cited by examiner

*Primary Examiner* — Lindsay M Maguire
(74) *Attorney, Agent, or Firm* — Kowert, Hood, Munyon, Rankin & Goetzel, P.C.

(57) ABSTRACT

Techniques are disclosed relating to determining a risk score for domains associated with a transaction. In some embodiments, a transaction computer system receives transaction details for a transaction between a consumer and a merchant, where the transaction details are received from the merchant real-time with the transaction and include a set of transaction URLs for subsequent use in the transaction. The computer system may receive, from a browser of the consumer that is used to initiate the transaction, URL referrer information real-time with the transaction, where the URL referrer information indicates a referring web page to the transaction computer system. The computer system may determine, using the set of transaction URLs and the URL referrer information, a set of domains for the transaction and then determine a risk score for the set of domains. The computer system may determine, based on the risk score, whether to allow the transaction.

20 Claims, 9 Drawing Sheets

IDENTIFYING DOMAINS FOR EVALUATION DURING TRANSACTION PROCESSING

BACKGROUND

Technical Field

This disclosure relates generally to processing electronic transactions, and, more specifically, to techniques for evaluating domains associated with electronic transactions.

Description of the Related Art

Transactions that generally occur between an initiating entity and a recipient entity may involve actions by third-party systems. These actions may include authorization, authentication, confirmation, validation, etc. In the context of payment transactions, these third-party systems may process payment transactions between a consumer (the initiating entity) and a merchant (the recipient entity). In some cases, third-party systems may perform actions related to these transactions. For example, a payment service provider may determine risk associated with requested payment transactions—for example, identifying fraudulent transactions, and possibly blocking them. A payment service provider may also track transactions to determine those that violate acceptable use policies. For example, a payment transaction may be requested for a product that is included on a list of banned products or may violate laws of a relevant jurisdiction. As payment service providers have taken steps to accurately assess risk, consumers and merchants seeking to facilitate fraud so too have evolved their tactics.

Figure 1:
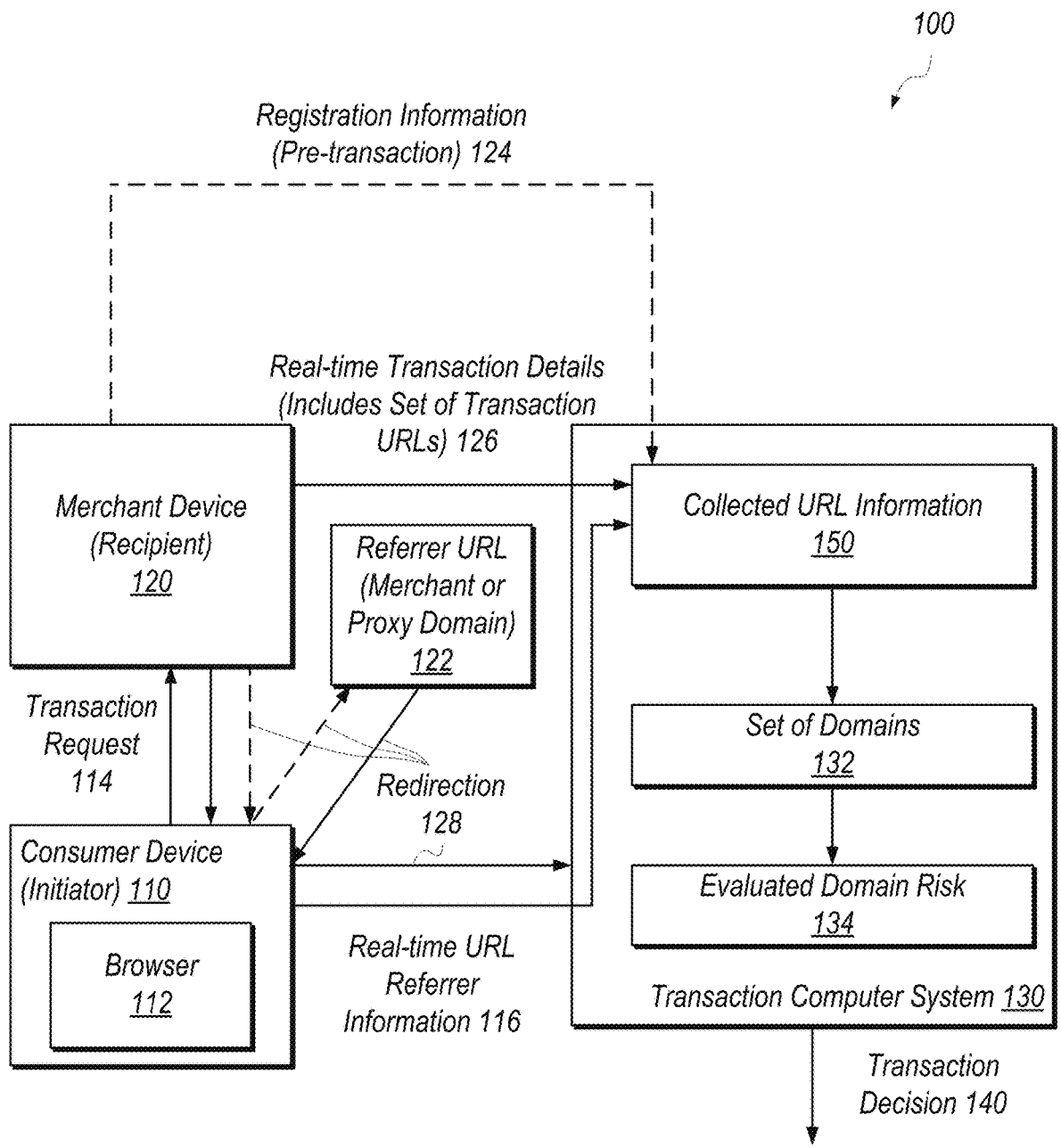
FIG. 1 is a block diagram illustrating example processing of a transaction between a consumer and a merchant by a transaction computer system using information provided real-time with the transaction, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "transaction computer system configured to evaluate risk associated with a set of domains" is intended to cover, for example, a computer system that performs this function during operation, even if it is not currently being used (e.g., when its power supply is not connected). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Techniques are disclosed herein for identifying multiple domains that may be associated with a transaction and then evaluating the transaction based on risk associated with those domains. In a transaction, an initiating entity may initiate the transaction with a recipient entity, with the transaction being validated or approved by a transaction computer system. In the context of a payment transaction, the initiating entity is typically a consumer, the recipient entity is typically a merchant, and the transaction computer system is a payment service such as PAYPAL®. But the disclosure is intended to broadly cover any transaction between two entities that uses third-party approval, including confirmation, validation, authorization, authentication, etc.

A traditional payment transaction might involve a consumer visiting a web page of a merchant, initiating a payment, which then causes the consumer to be directed to a web page of a payment service such as PAYPAL. Some merchants, however, are now attempting to obfuscate their identities through the use of intermediate domains (referred to within this document as "proxy domains") between a first domain associated with the merchant and a second domain associated with the transaction computer system. By routing transactions through these proxy domains, a merchant may be able to obscure the source of a transaction such that the transaction processing system cannot identify the merchant associated with the transaction. Because these proxy domains may be generated as-needed or on-the-fly by the merchant, the constant use of different proxy domains also poses a problem as far as properly assessing risk of these transactions. In a scenario in which a consumer initiates a transaction with a merchant and the merchant may then redirect the consumer to one or more proxy domains, one of which ultimately sends a request for the transaction to a transaction processing system, the merchant may be attempting to conduct transactions that violate acceptable use policies of the transaction processing system. For example, the merchant may be obfuscating the original source and certain details of the transaction (e.g., a description of an item being sold). Consider an example in which a consumer visits merchant.com and selects a button of the transaction processing system displayed by the merchant site to initiate a transaction that violates acceptable use policies. The consumer is then redirected to newdomain123.xyz (e.g., a proxy domain). In this example, the consumer is then redirected from newdomain123.xyz to the transaction processing system's website to complete the transaction, with the result that the transaction processing system does not know that the transaction originated at merchant.com.

The present inventors have recognized that the above-noted risks can be more properly considered by taking into account certain real-time transaction details. These details include URL referrer information that indicates the web page that was the referring web page to the domain of the transaction computer system. For example, a web page in domain newdomain123.xyz might be the referring URL to a web page in domain PAYPAL.COM. These real-time transaction details may also include so-called transaction URLs, which are URLs specified by the merchant for subsequent steps in the transaction. Three examples of transaction URLs are a return URL (specifying a URL the consumer is to be directed to upon successful completion of the transaction), a cancellation URL (specifying a URL the consumer is to be directed to upon failure or cancellation of the transaction), and a notification URL (specifying a URL of the merchant to which transaction confirmation details are to be provided upon completion of the transaction). Evaluating transactions based on such information may allow a transaction processing system to more accurately assess risk, as well as to identify transactions that violate acceptable use policies of the transaction processing system. In some embodiments, pre-transaction information from the merchant may also be used to assess transaction risk. This information may include, for example, self-reported merchant domain information that can be compared to domains that are identified using real-time transaction details.

Example Transaction Processing System

FIG. 1 is a block diagram illustrating example processing of a transaction between a consumer (this is an example of an "initiating entity") and a merchant (an example of a "recipient entity") by a transaction computer system using information provided real-time with the transaction. In the illustrated embodiment, system 100 includes a transaction computer system 130 that evaluates a transaction that involves a consumer device 110 and a merchant device 120.

Consumer device 110, in the illustrated example, initiates a transaction with merchant device 120 by sending a transaction request 114 via browser 112. For example, a user of consumer device 110 may click a button or link or other graphical element of a merchant web page displayed via their browser 112 to initiate a transaction with that merchant. In some embodiments, the transaction initiated by consumer device 110 is a payment transaction. Based on the transaction request 114, merchant device 120 then redirects the device's browser 112 to a transaction page of transaction computer system 130 to complete the transaction. As noted above, this redirection can be direct (i.e., from a web page of the merchant to a web page of transaction computer system 130 with no intervening web pages), or indirect such as redirection 128 (i.e., via one or more intervening web pages associated with proxy domains).

In the illustrated example, consumer device 110 sends URL referrer information 116 real-time with the transaction that consumer device 110 initiated with merchant device 120. In some embodiments, URL referrer information 116 is included in transaction request 114 when it is redirected to transaction computer system 130 by merchant device 120. The URL referrer information 116 may include a referrer URL as part of an HTTP request (e.g., transaction request 114) for navigating from the merchant web page displayed via browser 112 to a destination web page of the transaction computer system for a transaction. In some embodiments, the URL referrer information specifies a URL of the referring web page. If the redirection to transaction computer system 130 is direct, the referrer URL will indicate a web page associated with a domain of the merchant (e.g., merchant.com); if the redirection is indirect, the referral URL will indicate a web page of the one or more proxy domains (e.g., newdomain123.xyz) that ultimately redirects the consumer to transaction computer system 130.

As used herein, the term "domain" is intended to be construed according to its well-understood meaning, which includes a grouping of multiple computer networks or hosts within the same infrastructure. Domains are typically identified by a "domain name" that corresponds to one or more IP addresses that allows users to access web resources via applications such as browsers. For example, the domain "merchant.com" may be associated with an IP address of a particular merchant, and this domain name may be used to access various web pages of the merchant's website—for example, www.merchant.com/checkout.

Merchant device 120, in the illustrated example, receives transaction request 114 and sends, in real time, transaction details 126 that include a set of transaction URLs to transaction computer system 130 with the transaction for processing the requested transaction. The set of transaction URLs may include a return URL, an abort URL, and a notification URL, as discussed in further detail below with reference to FIG. 2. The transaction details 126 may further include, for the transaction, a payment amount, a currency type, a description, a reference number, etc.

In some embodiments, merchant device 120 sends pre-transaction registration information 124 to transaction computer system 130 prior to one or more transactions being initiated with merchant device 120. This pre-transaction registration information 124 may include one or more of the following for the merchant: company name, expected transaction volume, date registered with the transaction computer system, contact email address(es), listed website (e.g., merchant.com), the type of company (e.g., products or services they expect to provide), etc. This information may be referred to as know-your-business (KYB) information and may be required by transaction computer systems 130 when a new merchant registers their account. Pre-transaction registration information 124 for a particular merchant may be compared to information associated with a requested transaction during transaction processing to assess whether to allow the requested transaction to proceed, for example.

As noted above, in some instances, merchant device 120 may redirect (e.g., redirection 128) the requested transaction through one or more proxy domains. Thus, browser 112 may be redirected to a web page that is associated with a different domain than the domain associated with the merchant. In such instances, the last of these proxy domains will become the referrer URL 122 that performs a redirection 128 of consumer device 110 to a web page at a domain associated with transaction computer system 130. For example, a consumer may initiate a transaction at merchant.com, but is redirected to newdomain123.xyz before being redirected a second time to paypal.com. In this example, the transaction computer system may have received URL information from the merchant indicating that its domain is merchant.com. The domain associated with the web page identified by the URL referrer information (domain123.xyz) may be determined to be different from the self-reported information. In situations where transaction request 114 is redirected through one or more proxy domains (one of which becomes referrer URL 122), real-time transaction details 126 and real-time URL referrer information 116 may also be routed through the one or more proxy domains to transaction computer system 130.

Transaction computer system 130, based on receiving a transaction processing request from merchant device 120, determines a set of domains 132 from the collected URL information 150. Transaction computer system 130 may determine this set of domains 132 from a number of different types of sources, including one or more URLs included in pre-transaction registration information 124, one or more transaction URLs included in transaction details 126, and one or more URLs included in the URL referrer information 116. Transaction computer system 130 evaluates domain risk 134 for respective ones of the set of domains 132. In the illustrated example, transaction computer system 130 generates a transaction decision 140 based on the evaluated domain risk 134 of domains in the set of domains 132. Transaction decision 140 may include, for example, instructions to allow the transaction to continue, block the transaction, send the transaction for further review by another transaction processing system, etc.

Figure 2:
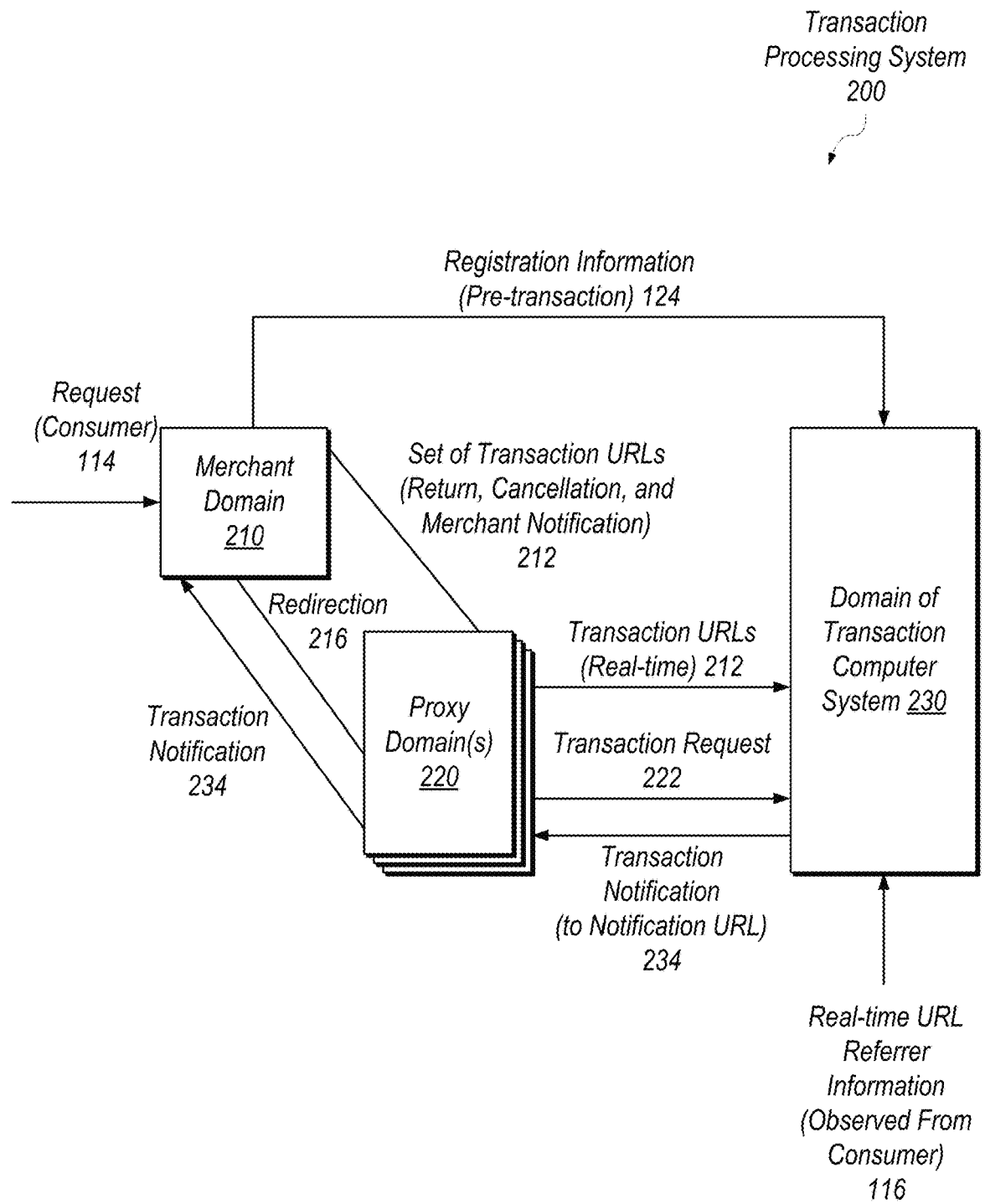
FIG. 2 is a diagram illustrating an example transaction processing system processing a transaction that is redirected through one or more proxy domains, according to some embodiments.

FIG. 2 is a diagram illustrating an example transaction processing system 200 processing a transaction that is redirected through one or more proxy domains 220. In the illustrated embodiment, a merchant domain 210 directs a consumer through one or more proxy domains 220. Ultimately, the browser of the consumer is redirected to a web page associated with the domain of transaction computer system 230 for processing.

Merchant domain 210, in the illustrated example, is a domain associated with a merchant and used by a consumer to initiate a transaction. In the illustrated example, a consumer sends a request 114 to merchant domain 210. Prior to receiving request 114 from a consumer device, merchant domain 210 sends pre-transaction registration information 124 to domain of transaction computer system 230. Merchant domain 210 performs a redirection 216 of the transaction request to a proxy domain 220. In some embodiments, the redirection includes a set of transaction URLs 212 (e.g., return, cancelation, and merchant notification) for the requested transaction.

One or more proxy domains 220 may receive the redirected request 114 and the set of transaction URLs and send a transaction request 222 to domain of transaction computer system 230. The one or more proxy domains 220 also send the set of transaction URLs 212 to the domain of transaction computer system 230. In some embodiments, proxy domain(s) 220 may include a multitude of newly generated domains. Each of the multitude of proxy domains may be used for a single transaction or multiple transactions. The return URL included in the set of transaction URLs 212 may be a URL that includes a proxy domain 220. In some embodiments, the domain included in the return URL specified by the merchant domain 210 for a transaction may be different than the proxy domain used to send transaction request 222 to domain of transaction computer system 230.

Domain of transaction computer system 230, in the illustrated embodiment, observes a referrer URL included in real-time URL referrer information 116 from the consumer's browser 112 that is observed to be using a proxy domain 220 to send transaction request 222. In some embodiments, domain of transaction computer system 230 observes the referrer URL by looking at a web page requested by the consumer device that includes a referring web page (e.g., the current web page viewed by the consumer) as part of the request for a new web page. Note that the referrer URL is discussed in further detail below with reference to FIGS. 5 and 6. The transaction request 222 may also include shipping information, payment details (e.g., credit card information, payment address), etc. for the transaction.

In the illustrated example, after processing transaction request 222, domain of transaction computer system 230 sends a transaction notification 234 to a URL specified in the set of transaction URLs 212 e.g., notification URL. In the illustrated example, the notification URL includes one of proxy domains 220. In the illustrated example, the notified proxy domain 220 then provides the transaction notification 234 to the merchant domain 210. Note that the merchant domain 210 may display a notification (e.g., a confirmation message) to the consumer who sent the request 114 via their browser 112.

In some embodiments, domain of transaction computer system 230 evaluates the transaction request 222 during (or before) processing the requested transaction. For example, domain of transaction computer system 230 may determine a difference between the website domain specified in the pre-transaction registration information 124 received from the merchant and the domain requesting the transaction (one of proxy domains 220). In this example, the domain of transaction computer system 230 may score the requesting domain based on the difference and in turn may block the transaction (or apply some other mitigation e.g., sending a multi-factor authentication request to the device requesting the transaction, requesting input for a CAPTCHA, increasing the risk score for the domain for future transactions sent through this domain, etc.) if the score satisfies a risk threshold. Further in this example, the domain of transaction computer system 230 may specify in transaction notification 234 that the transaction was blocked.

Figure 3:
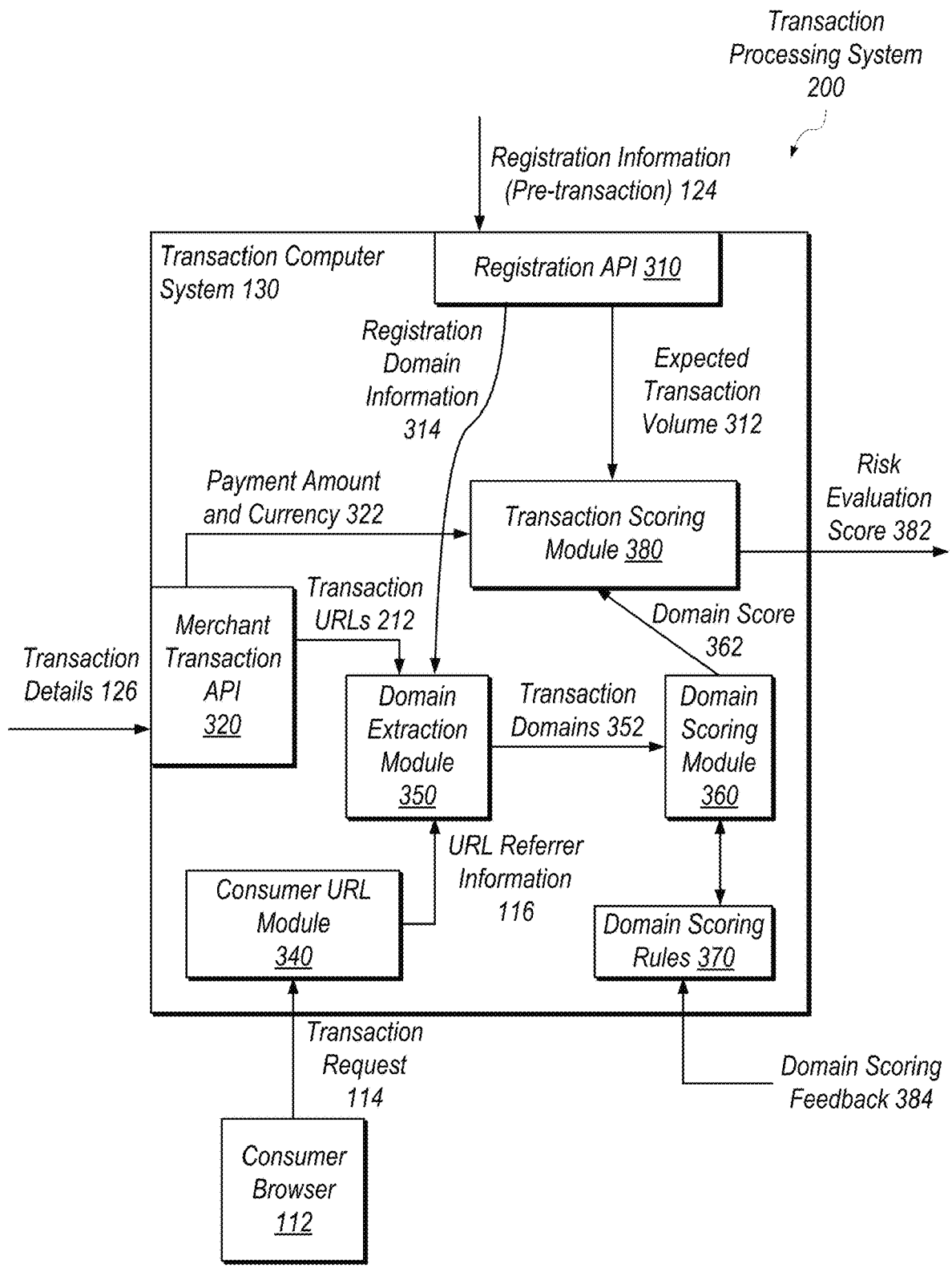
FIG. 3 is a block diagram illustrating an example transaction computer system used to evaluate risk associated with transactions, according to some embodiments.

FIG. 3 is a block diagram illustrating an example transaction computer system used to evaluate risk associated with transactions, according to some embodiments. In the illustrated embodiment, transaction computer system 130 of transaction processing system 200 includes APIs 310 and 320 for processing registration and transaction information, respectively, and several different modules 340, 350, 360, and 380 for processing and evaluating information for a transaction.

Transaction computer system 130, in the illustrated example, receives a transaction request 114 from a consumer browser 112 at consumer URL module 340. Consumer URL module 340 sends a referrer URL observed from transaction request 114 to domain extraction module 350. The transaction computer system 130 also receives transaction details 126 at merchant transaction API 320 and pre-transaction registration information 124 at registration API 310. Payment amount and currency type 322 are then conveyed to transaction scoring module 380 and transaction URLs 212 are conveyed to domain extraction module 350.

Registration domain information 314 received via registration API 310 is conveyed to domain extraction module 250 and an expected transaction volume 312 is conveyed to transaction scoring module 380. Domain extraction module may thus receive web page information from up to three sources: 1) URL referrer information 116, 2) transaction URLs 212, and 3) registration domain information 314. After extracting domains from these web pages, domain transaction module 350 sends a set of transaction domains 352 to domain scoring module 360. Note that in some cases, the domain included in the return URL specified in the transaction URLs 212 may be the same as the domain included in the URL referrer information 116. For example, in one scenario, a particular proxy domain may be used to request transaction processing, and this same proxy domain is specified in the return URL provided with the requested transaction. In contrast, in another scenario, a first proxy domain may be used to request transaction processing and a second, different proxy domain is specified in the return URL. Further, both the first and the second proxy domains may be different than one or more domains included in the registration domain information 314. In this latter scenario, the transaction processing system 200 may determine that the requested transaction is suspicious, meaning that the transaction may be investigated further, blocked, reported, etc.

Domain scoring module 360, in the illustrated example, determines a score for the domain associated with transaction request 114 based on one or more domain scoring rules 370 and information associated with the different domains, and provides a domain score 362 to transaction scoring module 380. In some embodiments, domain scoring module 360 scores one or more domains associated with the transaction. For example, domain scoring module 360 may score domains from one or more of the following domain sources: domains included in the merchant registration information, one or more domains associated with the transaction URLs, one or more domains observed from the referrer URL, etc. Note that domain scoring module 360 may, in various embodiments, generate a single score based on all domains determined to correspond to the transaction. Note that scoring criteria for scoring a transaction based on domains determined to correspond to the transaction are discussed in detail below with reference to FIG. 7.

Transaction scoring module 380 then determines a risk evaluation score 382 for the requested transaction based on the expected transaction volume 312, the domain score 362, the payment amount and currency type 322, as well as any other available information. Note that any of various types of information may be used by transaction scoring module 380 to score transactions. In some embodiments, domain scoring feedback 384 generated based on the risk evaluation score 382 is used to adjust one or more domain scoring rules 370 for scoring subsequent transactions.

In other embodiments, information other than URL information that is indicative of domains may be used to monitor and evaluate transactions. For example, while the disclosure refers to the use of URLs to assess domains (including proxy domains) that are involved in a particular transaction, if other information indicative of domains (including proxy domains) other than the URLs is available, that information may also be used to evaluate and monitor transactions. In one scenario, the merchant API might specify that the merchant provide the return, cancelation, and notification domains (instead of or addition to the relevant URLs). This "domain information" (which could include the URL information that has been described) could similarly be used to perform the types of transaction analyses disclosed herein. Other information indicative of domains associated with a transaction may include: one or more IP addresses, hosting network information (other domains hosted by this network), autonomous system information (e.g., domain associated with an autonomous system number (ASN)), registration information (e.g., domain determined from an email address), etc.

Example Transaction Processing

Figure 4:
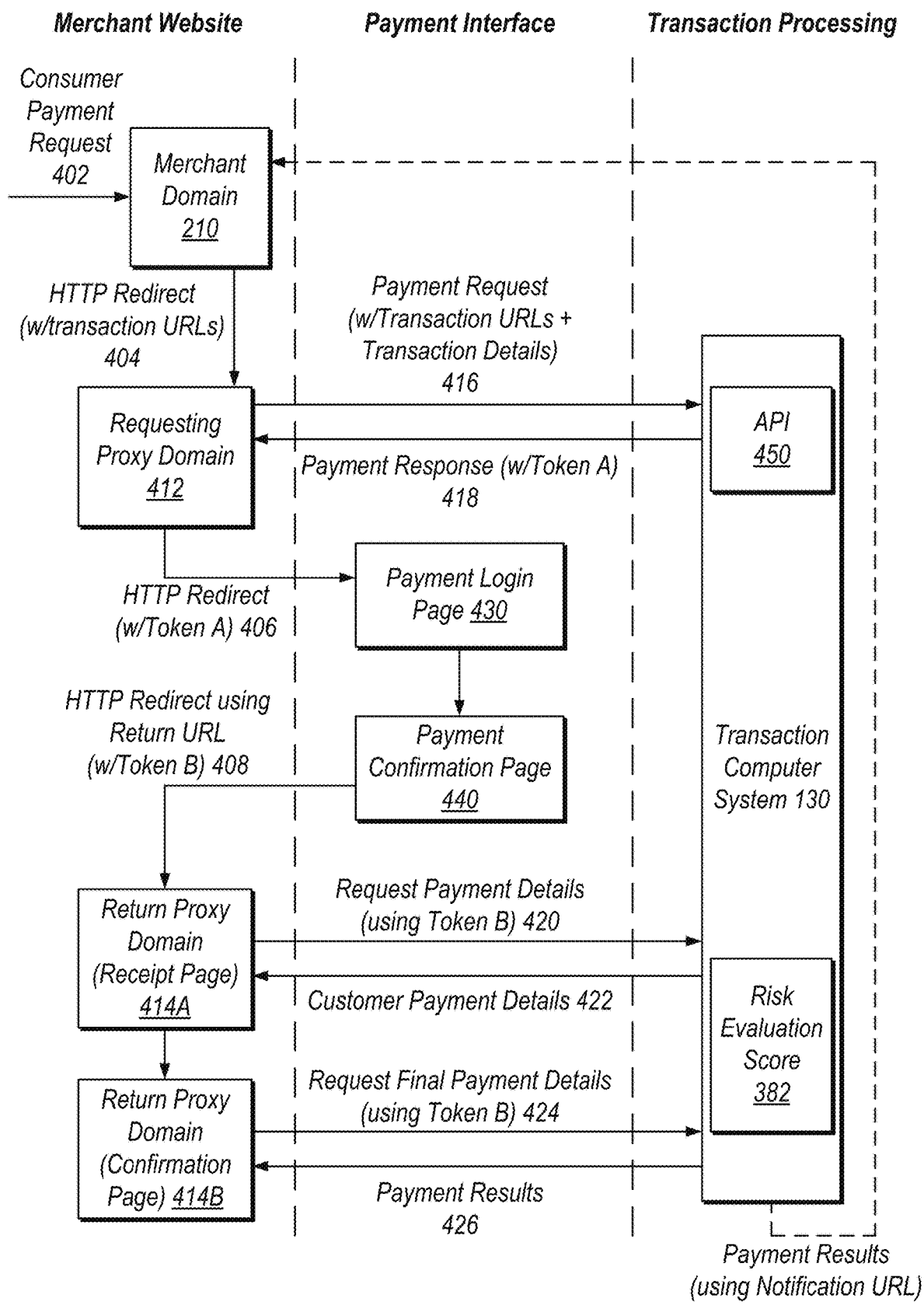
FIG. 4 is a block diagram illustrating example processing by a payment system of a payment transaction involving multiple proxy domains, according to some embodiments.

FIG. 4 is a block diagram illustrating example processing by a payment system of a payment transaction involving one or more proxy domains, according to some embodiments. In the illustrated embodiment, a merchant website conducts a payment transaction through a transaction processing system that provides various web pages 430 and 440 of a payment interface by sending a transaction request to a transaction computer system 130 of the transaction processing system 200.

In the illustrated example, a consumer initiates a transaction at a merchant web site associated with merchant domain 210 by submitting a payment request 402. For example, the consumer may click on a payment button or other graphical element displayed on the merchant web site. In some instances, the merchant web site may have code that is associated with a payment system such as PAYPAL. Once the consumer initiates the transaction, merchant domain 210 redirects the transaction through a requesting proxy domain 412 using an HTTP redirect 404, for example. In the illustrated example, the HTTP redirect 404 includes a set of transaction URLs for the transaction. These transaction URLs may be required by an API 450 of the transaction computer system 130.

Requesting proxy domain 412, in the illustrated example, sends a payment request 416 that includes transaction URLs and transaction details to transaction computer system 130. In some embodiments, payment request includes an account identifier of the merchant associated with merchant domain 210. Requesting proxy domain 412 receives a payment response 418 from transaction computer system 130 that includes token A authorizing the domain to continue the payment transaction via a payment interface of the payment system. Requesting proxy domain 412 then performs an HTTP redirect 406 using token A to direct the consumer's browser to a payment login page 430. The consumer may enter credentials for their payment account with the payment system and thus be directed to a payment confirmation page 440 based on successful confirmation of the user's login credentials by the payment system. Payment confirmation page 440 may include information that prompts the consumer to select a payment method and confirm the payment method before proceeding with processing the transaction. Once the user confirms a payment method, the payment system performs an HTTP redirect 408 using the return URL specified in the set of transaction URLs included in the payment request from requesting proxy domain 412 to return proxy domain 414A. The HTTP redirect includes a second token B for use in requesting payment details from the transaction computer system 130. Return proxy domain 414A displays a receipt page to the consumer based on successful login via the payment interface.

Return proxy domain 414A, in the illustrated example, sends a request 420 for payment details to transaction computer system 130 using token B and receives customer payment details 422. Note that return proxy domain 414 may display two different web pages, a receipt page and a confirmation page. Based on the payment details, return proxy domain 414B sends a request for final payment details 424 using token B and receives payment results 426 from transaction computer system 130. The request for final payment details 424 may be the request that triggers movement of funds from the consumer to the merchant. Note that transaction computer system 130 provides payment results 426 based on a return URL specified in the set of transaction URLs received from requesting proxy domain 412. The transaction computer system 130 may optionally send payment results 428 to the merchant based on a notification URL specified in the set of transaction URLs received from requesting proxy domain 412. Transaction computer system 130 may send these payment results 428 through a communication channel that is that is separate from the communication channel used to communicate with the consumer (via domains 414). This type of communication may be referred to as "out-of-band" communication. Sending an independent payment confirmation directly to the merchant may improve security for a payment transaction by ensuring that the consumer cannot tamper with the payment results (where the consumer cannot see the independent payment confirmation sent to the merchant).

In the illustrated example, return proxy domain 414B displays a confirmation page to the consumer based on the transaction being approved by transaction computer system 130. Transaction computer system 130 may block the payment transaction or may send the payment transaction for further evaluation by another payment server of the payment system at any of various stages within the transaction flow displayed in FIG. 4. For example, transaction computer system 130 may block the payment transaction based on an evaluated risk score for the transaction satisfying a risk threshold.

In some embodiments, transaction URLs and transaction details for a request are sent to the transaction computer system 130 as part of HTTP redirect 406 (along with token A). For example, the transaction URLs and transaction details may be visible to the consumer (within the URL) during the HTTP redirect 406. In such embodiments, payment confirmation page 440 may communicate with transaction computer system 130 directly to attempt a payment transaction (e.g., movement of funds from the consumer to the merchant) and once the payment transaction has been initiated, performs HTTP redirect 408 and includes payment results in the redirect to return proxy domain 414A. Further, transaction computer system may inform the merchant of the payment results for the transaction via the notification URL included in the transaction URLs sent as part of HTTP redirect 406.

Example Real-Time URL Referrer Information

Figure 5:
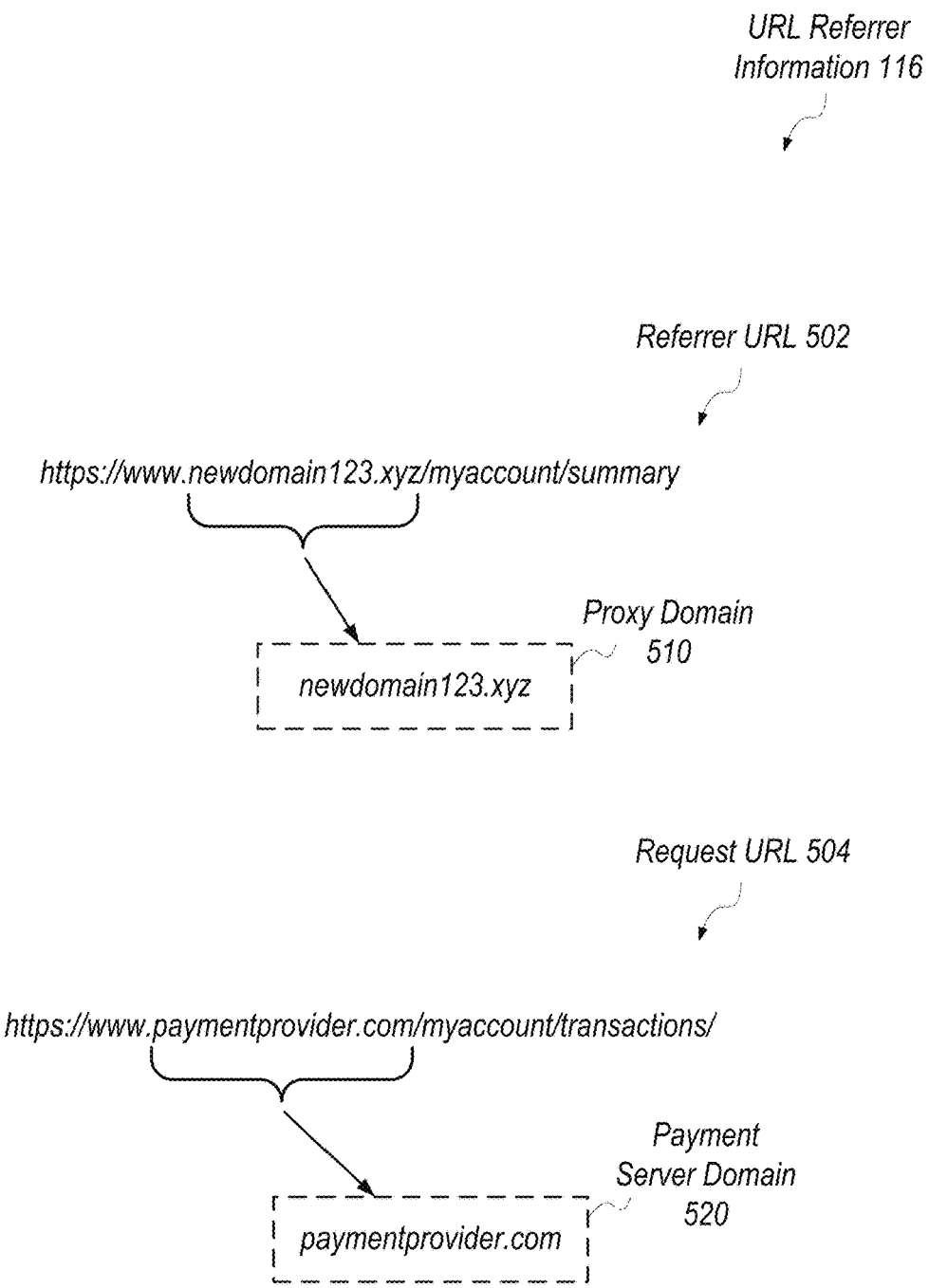
FIGS. 5 and 6 are diagrams illustrating example uniform resource locator (URL) referrer information included in transaction requests, according to some embodiments.

FIG. 5 is a diagram illustrating example URL referrer information 116 included in a transaction request, according to some embodiments. In the illustrated embodiment, URL referrer information 116 includes referrer URL 502 and request URL 504. As used herein, a "URL," or uniform resource locator, is intended to be have its customary meaning, which is a type of uniform resource identifier (URI) that specifies a location associated with a host system or device within a computer network.

Referrer URL 502, in the illustrated example, is a URL for a consumer account summary page e.g., on a merchant website. The referrer URL 502 includes a proxy domain 510 called "newdomain123.xyz" that is used by a merchant to conduct a transaction with the consumer.

Request URL 504, in the illustrated example, is a URL for a transaction initiated by a consumer that is being processed by a payment provider e.g., on a website of the payment provider. The request URL 504 includes a payment server domain 520 called "paymentprovider.com" that is used to authorize a payment transaction between a consumer and a merchant. In some embodiments, a consumer device 110 provides the referrer URL 502 and the request URL 504 as part of a request for direction to a payment web page during a transaction.

Figure 6:
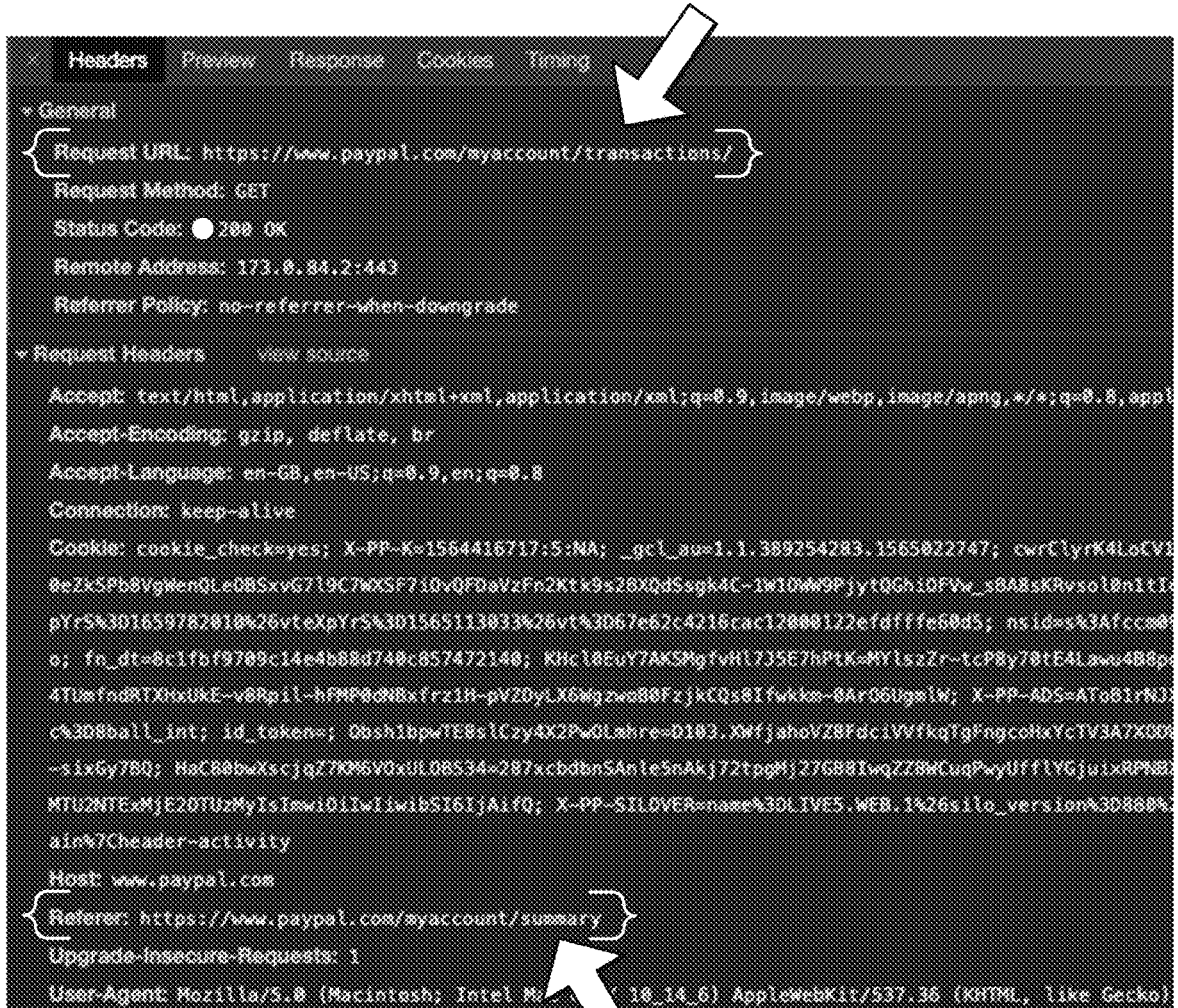

FIG. 6 is a diagram illustrating example URL referrer information 116 that includes additional information to the referrer URL 512 and request URL 514 shown in FIG. 5. In the illustrated example, a request URL 614 is shown as "https://www.paypal.com/myaccount/transactions/" and a referrer URL 612 is shown as "https://www.paypal.com/myaccount/summary." Various other URL referrer information 116 is shown in the illustrated example.

Example Risk Scoring Systems

Figure 7:
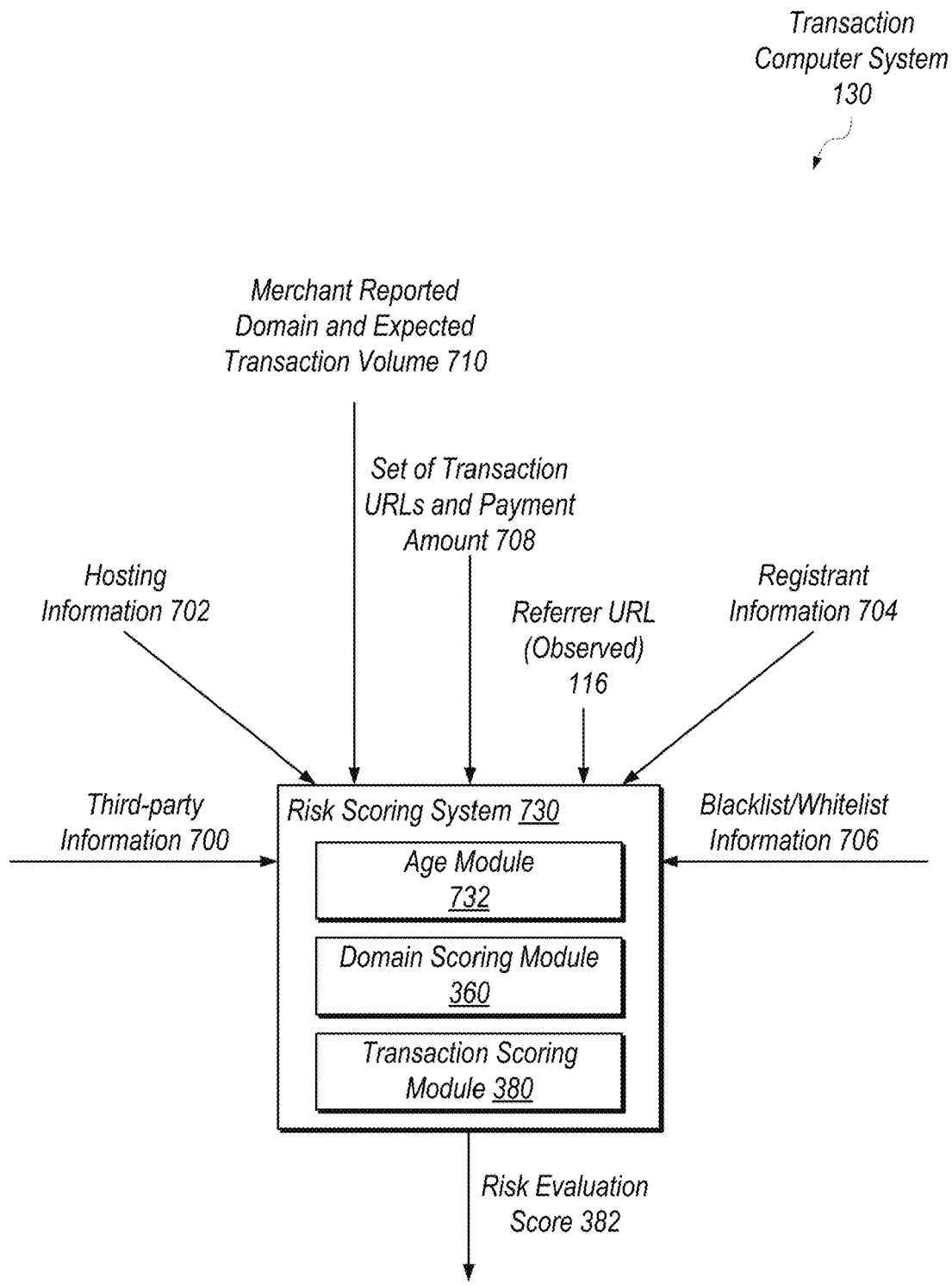
FIG. 7 is a block diagram illustrating an example risk scoring system of a payment transaction server, according to some embodiments.

FIG. 7 is a block diagram illustrating an example risk scoring system of a payment transaction server, according to some embodiments. In the illustrated embodiment, transaction computer system 130 includes a risk scoring system 730 that includes three different modules 732, 360, and 380 for determining a risk evaluation score 382 for a transaction.

Risk scoring system 730, in the illustrated embodiment, receives third-party information 700 (i.e., information obtained from one or more sources that are external to the transaction computer system 130). For example, third-party information 700 may be open source intelligence (OSINT) information associated with one or more domains included in the set of domains 132 determined by transaction computer system 130. In some embodiments, third-party information 700 includes hosting information 702, registrant information 704, and blacklist/whitelist information 706.

Hosting information 702, sent to risk scoring system 730 in the illustrated example, may include one or more of the following: a hosting company name, whether the hosting company has a shared or dedicated server, the reputation of the hosting company (e.g., does this company host domains that are blacklisted?)—this could include the reputation of the company's internet protocol (IP) address, a geographical location from which the network is announced, etc.

Registrant information 704, received by risk scoring system 730 in the illustrated example, includes information associated with registrants of one or more domains included in the set of domains 132. For example, this information may include the registrants: name, address (e.g., business or residential), email address, phone number, etc. The registrant information may be associated with a registrant of a domain initiating a transaction or with a registrant of a recipient domain. Blacklist and whitelist information 706, shown in the illustrated example, may include a blacklist of domains that are known to facilitate transactions that violate acceptable use policies (AUP) that are blocked from facilitating new transactions or a whitelist of domains that are approved for facilitating transactions.

In the illustrated example, risk scoring system 730 also receives merchant reported information 710 that includes a self-reported domain and an expected transaction volume. For example, the self-reported domain may be a domain with which the merchant expects to facilitate one or more transactions and the expected transaction volume may be a number of transactions within a given time that the merchant expects to facilitate. In the illustrated embodiment, the risk scoring system 730 receives information 708 that includes a set of transaction URLs and a payment amount. The set of transaction URLs may include, for example, a return, cancellation, and merchant notification URLs as discussed above with reference to FIG. 2. The payment amount may be provided real-time with a particular transaction and may specify a dollar amount and currency for the particular transaction.

Age module 732, in the illustrated example, determines an age for one or more domains included in the set of domains 132. For example, if a domain was registered five days prior to a transaction facilitated by the domain, then age module 732 assigns an age of five days to the domain. As another example, if a domain was registered five years prior to a transaction facilitated by the domain, but has been sold to a new owner within two days of the transaction, age module 732 assigns an age of two days to the domain.

Domain scoring module 360, in the illustrated embodiment, scores one or more domains included in the set of domains 132. Domain scoring module 360 may score domains based on their registration date, domain registrar, domain registrant, domain transfer history, etc. For example, domain scoring module 360 may add 15 points to the score of a domain if that domain is less than 30 days old (or has been transferred to a new owner within the last 30 days). As another example, domain scoring module 360 may add 10 points to a domain if that domain is included on a domain blacklist. As yet another example, based on the publicly available company details associated with the domain registrant (the entity who registered the domain), domain scoring module 360 may determine whether the email, phone number, etc. of the registrant are associated with higher risk. In some situations, when scoring a particular domain, domain scoring module 360 may determine whether registrant information for the particular domain is observed for other domains associated with high risk. In such situations, if the registration information is observed for domains associated with high risk, then domain scoring module 360 may score the particular domain similarly.

Domain scoring module 360 may assign risk points to a domain if the domain was registered by an individual instead of a company. As another example, the following information associated with an email address of the registrant may be used to score the domain: top-level domain (TLD), domain of the email (e.g., if the email domain does not match the company domain, then the company domain is associated with higher risk), a number of domains registered using this email (and their reputation), etc. In some embodiments, risk scoring system 730 may individually evaluate the domain of the email address of the registrant (in addition to evaluating domains associated with a particular transaction). Domain scoring module 360 may also assign points to a domain based on the following information associated with the phone number of the domain registrant: county code, area code, voice over internet protocol (VOIP) provider reputation, a number of domains registered using this phone number (and their reputation), etc.

In some embodiments, domain scoring module 360 assigns risk points based on domain privacy (e.g., WHOIS information). For example, if the registrant of a domain has requested privacy for their information, a domain name registrar may replace the information of the registrant with information of a forwarding service. In this example, if a domain is currently private, then this domain may be assigned a greater number of risk points by domain scoring module 360. As another example, if a private domain was previously registered to a registrant associated with risk before being made private and the domain was not sold after being made private, domain scoring module may evaluate the domain based on registration details that were available prior to the domain being made private.

Transaction scoring module 380, in the illustrated example, assigns a final risk evaluation score 382 to a transaction based on scores of domains within the set of domains 132 associated with the transaction. For example, transaction scoring module 380 may determine a risk evaluation score 382 for a transaction by summing domain scores associated with the transaction. In some embodiments, transaction scoring module 380 determines score 382 based on both domain scores and URL scores. For example, transaction scoring module 380 may determine whether a merchant supplied URLs (e.g., URLs included in pre-transaction registration information 124), API-supplied URLs (e.g., URLs included in the set of transaction URLs 212), and observed URLs (e.g., observed from URL referrer information 116) generally match.

In some embodiments, transaction scoring module 380 assigns a score 382 to a transaction based on hosting information 702 for the transaction. For example, if the hosting provider of the website used for a transaction does not have a dedicated server and the merchant associated with the transaction has a high total payment volume (TPV), then the transaction scoring module 380 may assign a higher risk evaluation score 382 to this transaction. Note that if the TPV of the merchant has been low historically, but in a recent time interval (e.g., within a few days of a current transaction) has increased significantly, transaction scoring module may assign a higher risk evaluation score to this transaction relative to transactions for merchants with a consistently high TPV (i.e., the merchant's TPV does not dramatically increase or decrease over time).

In some embodiments, transaction scoring module 380 may assign a score to a requested transaction based on determining whether a merchant account associated with the requested transaction has received payments from one or more of the domains included in the set of domains scored by domain scoring module 360 prior to the requested transaction. If the merchant account has received payments through these domains, then transaction scoring module 380 may determine a length of time the merchant account has received payments from the one or more domains and one or more other merchant accounts that have received payments through these domains. In some embodiments, transaction scoring module 380 determines risk or restrictions associated with the one or more other merchant account. In some embodiments, transaction scoring module 380 determines whether the merchant account has received payments from new domains within a threshold time interval (e.g., within a few days) of the requested transaction.

In some embodiments, transaction scoring module 380 may assign a score 382 to a transaction based on a total number of transactions that have been routed through one or more domains associated with that transaction. In some embodiments, transaction scoring module 380 may score a transaction based on the number of domains registered by a merchant associated with the transaction (e.g., if the merchant has registered or used one thousand new domains within a three-month period).

Example Method

Figure 8:
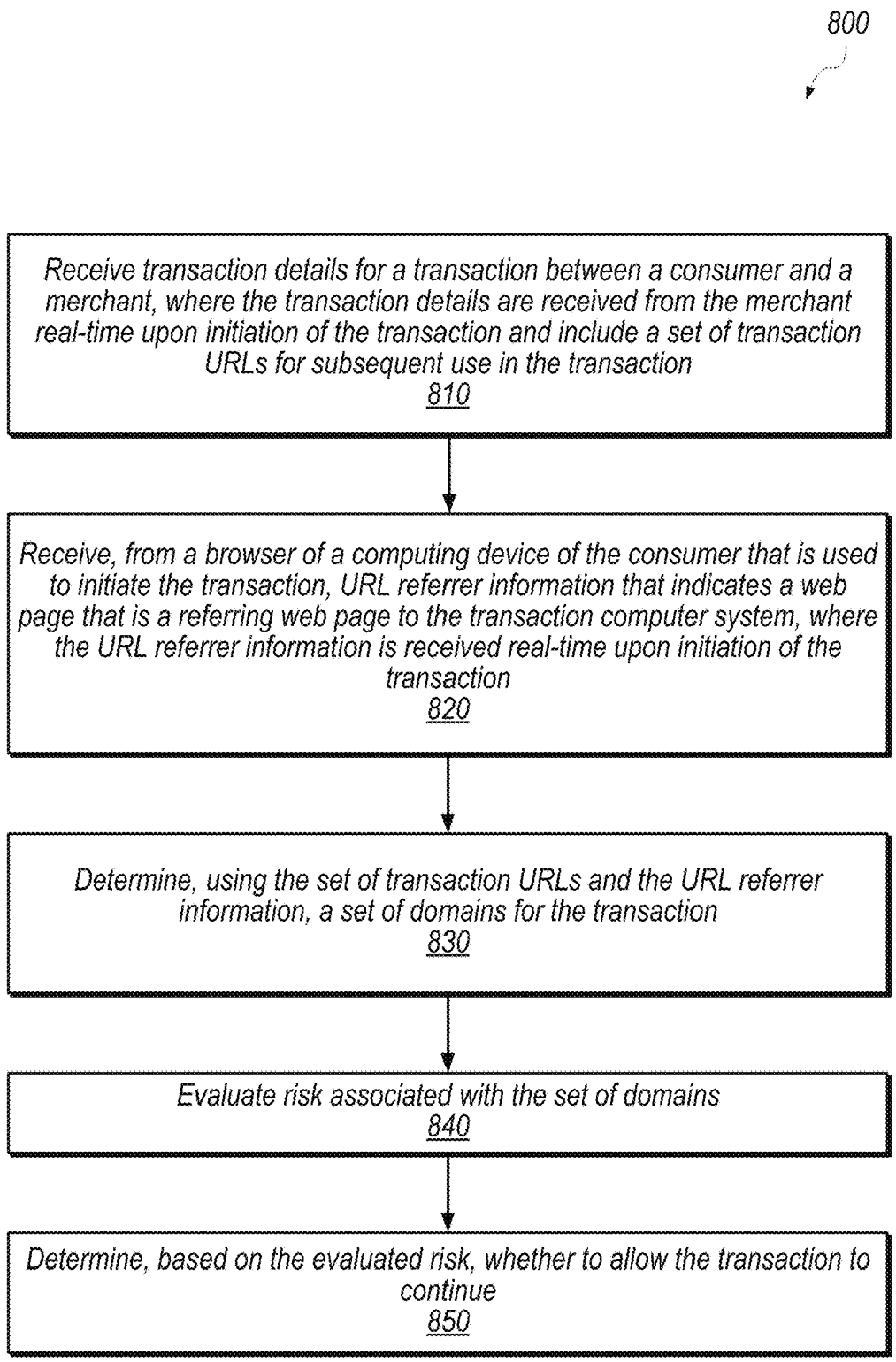
FIG. 8 is a flow diagram illustrating a method for determining whether to allow an initiated transaction to continue based on evaluating risk of one or more domains associated with the initiated transaction, according to some embodiments.

FIG. 8 is a flow diagram illustrating a method for determining whether to allow an initiated transaction to continue based on evaluating risk of one or more domains associated with the initiated transaction, according to some embodiments. The method 800 shown in FIG. 8 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 810, in the illustrated embodiment, a transaction computer system receives transaction details for a transaction between a consumer and a merchant, wherein the transaction details are received from the merchant real-time upon initiation of the transaction and include a set of transaction URLs for subsequent use in the transaction. In some embodiments, the set of transaction URLs specified by the merchant includes one or more of the following URL types: a return URL, a cancelation URL, a notification URL. (This phraseology is intended to cover the scenario in which the set of transaction URLs includes one of all three types, as well as a scenario in which only one or two types are present. Thus, a system that has an application programming interface (API) that specifies a return URL and a cancelation URL but not a notification URL would fall within the scope of "one or more of a return URL, a cancelation URL, a notification URL."

In some embodiments, the set of transaction URLs include a return URL to which the consumer is to be directed upon completion of the transaction. In some embodiments, the set of transaction URLs includes a cancelation URL to which the consumer is to be directed if the transaction is canceled. In some embodiments, the set of transaction URLs includes a notification URL of the merchant to which transaction confirmation details are to be provided upon completion of the transaction.

At 820, the transaction computer system, the transaction computer system receives, from a browser of a computing device of the consumer that is used to initiate the transaction, URL referrer information that indicates a web page that is a referring web page to the transaction computer system, where the URL referrer information is received real-time upon initiation of the transaction. In some embodiments, the URL referrer information is received as part of an HTTP request for navigating from the referring web page to a destination web page of the transaction computer system, where the URL referrer information specifies a URL of the referring web page.

At 830, the transaction computer system determines, using the set of transaction URLs and the URL referrer information, a set of domains for the transaction.

At 840, the transaction computer system evaluates risk associated with the set of domains. In some embodiments, evaluating risk associated with the set of domains is based on ages of domains in the set of domains. In some embodiments, evaluating risk associated with the set of domains includes comparing domains of the URL of the referring web page, the self-reported domain information, and domain information included in the set of transaction URLs.

In some embodiments, evaluating the risk associated with the set of domains includes determining an age of one or more domains in the set of domains and assigning, based on respective ages of the one or more domains, risk points to the one or more domains. In some embodiments, evaluating the risk associated with the set of domains includes generating, based on the assigned risk points, a score for the transaction.

At 850, the transaction computer system determines, based on the evaluated risk, whether to allow the transaction to continue. In some embodiments, the transaction computer system receives, prior to the transaction, registration information from the merchant, wherein the registration information includes self-reported domain information for the merchant. In some embodiments, the set of domains that are determined include the self-reported domain information. In some embodiments, the registration information includes expected transaction volume, where the transaction details for the transaction include a payment amount. In some embodiments, determining whether to permit the transaction is based on the expected transaction volume and the payment amount. In some embodiments, the transaction computer system determines whether to approve, block, or classify the transaction for further review.

In some embodiments, the registration information includes contact information of the merchant, where contact information for one or more registrants of domains included in the set of transaction URLs is available. In some embodiments, determining whether to permit the transaction is based on the contact information of the merchant and the contact information of the registrants of the domains included in the set of transaction URLs. In some embodiments, evaluating risk associated with the set of domains includes determining, during the transaction based on third-party domain information, a transfer history of one or more domains in the set of domains. In some embodiments evaluating risk associated with a transaction includes, prior to the transaction being complete, determining whether the recipient entity has previously initiated transactions with domains included in the recipient-supplied domain information, the captured domain information, and the API-supplied domain information.

In some embodiments, the transaction details include a payment amount and a currency of the transaction, where the registration information includes an expected payment volume and an expected currency. In some embodiments, determining a risk associated with the transaction includes: comparing the expected payment volume and the expected currency with the payment amount and the currency of the transaction specified by the request and determining, based on the comparing, a risk score for the transaction. In some embodiments, determining risk associated with the transaction includes: determining a reputation of one or more companies hosting websites associated with the recipient-supplied domain information, the captured domain information, and the API-supplied domain information and determining whether a geographical location of one or more companies hosting the websites matches geographical information included in the registration information. In some embodiments, an entity initiating a transaction with a recipient entity is a consumer and the recipient entity is a merchant, and the transaction computer system is associated with a payment service provider.

Evaluating transactions based on real-time transaction details, real-time referrer information, and merchant registration information may allow a transaction processing system to determine one or more risky domains, which in turn may advantageously allow the system to prevent transactions conducted using those risky domains. Disclosed techniques for identifying and evaluating newly generated domains real-time with an initiated transaction may advantageously reduce or prevent a number of transactions that are routed through these newly generated domains and violate acceptable use policies from being approved by a transaction processing system.

Example Computing Device

Figure 9:
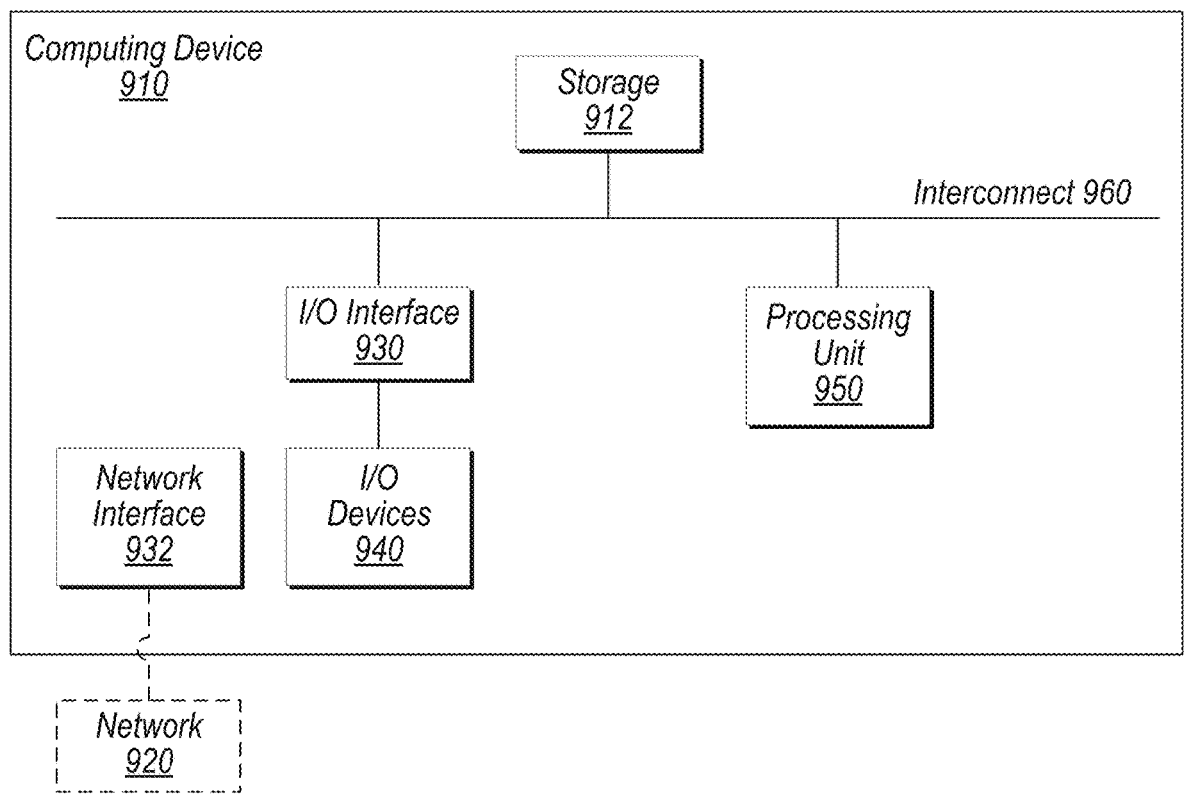
FIG. 9 is a block diagram illustrating an example computing device, according to some embodiments.

Turning now to FIG. 9, a block diagram of one embodiment of computing device (which may also be referred to as a computing system) 910 is depicted. Computing device 910 may be used to implement various portions of this disclosure. Computing device 910 may be any suitable type of device, including, but not limited to, a personal computer system, desktop computer, laptop or notebook computer, mainframe computer system, web server, workstation, or network computer. As shown, computing device 910 includes processing unit 950, storage 912, and input/output (I/O) interface 930 coupled via an interconnect 960 (e.g., a system bus). I/O interface 930 may be coupled to one or more I/O devices 940. Computing device 910 further includes network interface 932, which may be coupled to network 920 for communications with, for example, other computing devices.

In various embodiments, processing unit 950 includes one or more processors. In some embodiments, processing unit 950 includes one or more coprocessor units. In some embodiments, multiple instances of processing unit 950 may be coupled to interconnect 960. Processing unit 950 (or each processor within 950) may contain a cache or other form of on-board memory. In some embodiments, processing unit 950 may be implemented as a general-purpose processing unit, and in other embodiments it may be implemented as a special purpose processing unit (e.g., an ASIC). In general, computing device 910 is not limited to any particular type of processing unit or processor subsystem.

Storage subsystem 912 is usable by processing unit 950 (e.g., to store instructions executable by and data used by processing unit 950). Storage subsystem 912 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 912 may consist solely of volatile memory, in one embodiment. Storage subsystem 912 may store program instructions executable by computing device 910 using processing unit 950, including program instructions executable to cause computing device 910 to implement the various techniques disclosed herein.

I/O interface 930 may represent one or more interfaces and may be any of various types of interfaces configured to couple to and communicate with other devices, according to various embodiments. In one embodiment, I/O interface 930 is a bridge chip from a front-side to one or more back-side buses. I/O interface 930 may be coupled to one or more I/O devices 940 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   receiving, at a transaction computer system, transaction details for a transaction between a consumer and a merchant, wherein the transaction details are received from the merchant real-time upon initiation of the transaction and include a set of multiple transaction URLs for subsequent use in the transaction;
   receiving, at the transaction computer system from a browser of a computing device of the consumer that is used to initiate the transaction, URL referrer information that indicates a web page that is a referring web page to the transaction computer system, wherein the URL referrer information is received real-time upon initiation of the transaction;
   determining, by the transaction computer system using the set of multiple transaction URLs and the URL referrer information, a set of domains for the transaction to be directed through;
   evaluating, by the transaction computer system, the transaction, including determining a risk score for the transaction, wherein evaluating risk is performed based on one or more proxy domains being included in the set of domains;
   determining, by the transaction computer system, whether the risk score satisfies a risk threshold; and in response to determining that the risk score satisfies the risk threshold, executing, by the transaction computer system, a process to block the transaction.

2. The method of claim 1, further comprising:
receiving, by the transaction computer system prior to the transaction, registration information from the merchant, wherein the registration information includes self-reported domain information for the merchant;
wherein the set of domains that are determined includes the self-reported domain information.

3. The method of claim 2, wherein the registration information includes an expected transaction volume, wherein the transaction details for the transaction include a payment amount, and wherein determining whether to permit the transaction is based on the expected transaction volume and the payment amount.

4. The method of claim 1, wherein the set of multiple transaction URLs includes a return URL to which the consumer is to be directed upon completion of the transaction.

5. The method of claim 4, wherein the set of multiple transaction URLs includes a cancelation URL to which the consumer is to be directed if the transaction is canceled.

6. The method of claim 1, wherein the set of multiple transaction URLs includes a notification URL of the merchant to which transaction confirmation details are to be provided upon completion of the transaction.

7. The method of claim 1, wherein the evaluating is based on ages of domains in the set of domains.

8. The method of claim 1, wherein the URL referrer information is received as part of an HTTP request for navigating from the referring web page to a destination web page of the transaction computer system, wherein the URL referrer information specifies a URL of the referring web page.

9. A system, comprising:
one or more processors and one or more computer-readable memories storing program instructions, the one or more processors configured to execute the program instructions to cause the system to perform operations comprising:
receiving transaction details for a transaction between a consumer and a merchant, wherein the transaction details are received from the merchant real-time upon initiation of the transaction and include a set of multiple transaction URLs for subsequent use in the transaction;
receiving from a browser of a computing device of the consumer that is used to initiate the transaction, URL referrer information that indicates a web page that is a referring web page to the system, wherein the URL referrer information is received real-time upon initiation of the transaction;
determining, using the set of multiple transaction URLs and the URL referrer information, a set of domains for the transaction to be directed through;
evaluating the transaction, including determining a risk score for the transaction, wherein evaluating risk is performed based on one or more proxy domains being included in the set of domains;
determining whether the risk score satisfies a risk threshold; and
in response to determining that the risk score satisfies the risk threshold, blocking the transaction.

10. The system of claim 9, the operations further comprising:
receiving, prior to the transaction, registration information from the merchant, wherein the registration information includes self-reported domain information for the merchant;
wherein the set of domains that are determined includes the self-reported domain information.

11. The system of claim 10, wherein the registration information includes an expected transaction volume, wherein the transaction details for the transaction include a payment amount, and wherein determining whether to permit the transaction is based on the expected transaction volume and the payment amount.

12. The system of claim 9, wherein the set of multiple transaction URLs includes a return URL to which the consumer is to be directed upon completion of the transaction.

13. The system of claim 12, wherein the set of multiple transaction URLs includes a cancelation URL to which the consumer is to be directed if the transaction is canceled.

14. The system of claim 9, wherein the set of multiple transaction URLs includes a notification URL of the merchant to which transaction confirmation details are to be provided upon completion of the transaction.

15. The system of claim 9, wherein the evaluating is based on ages of domains in the set of domains.

16. The system of claim 9, wherein the URL referrer information is received as part of an HTTP request for navigating from the referring web page to a destination web page of the system, wherein the URL referrer information specifies a URL of the referring web page.

17. A computer program product, comprising:
one or more computer-readable tangible storage devices, and program instructions stored on at least one of the one or more computer-readable tangible storage devices, the program instructions when executed cause a machine to perform operations comprising:
receiving transaction details for a transaction between a consumer and a merchant, wherein the transaction details are received from the merchant real-time upon initiation of the transaction and include a set of multiple transaction URLs for subsequent use in the transaction;
receiving, from a browser of a computing device of the consumer that is used to initiate the transaction, URL referrer information that indicates a web page that is a referring web page to the machine, wherein the URL referrer information is received real-time upon initiation of the transaction to be directed through;
determining, using the set of multiple transaction URLs and the URL referrer information, a set of domains for the transaction;
evaluating the transaction, including determining a risk score for the transaction, wherein evaluating risk is performed based on one or more proxy domains being included in the set of domains;
determining whether the risk score satisfies a risk threshold; and
in response to determining that the risk score satisfies the risk threshold, executing a process to block the transaction.

18. The computer program product of claim 17, the operations further comprising:
receiving, prior to the transaction, registration information from the merchant, wherein the registration information includes self-reported domain information for the merchant;

wherein the set of domains that are determined includes the self-reported domain information.

19. The computer program product of claim 18, wherein the registration information includes an expected transaction volume, wherein the transaction details for the transaction include a payment amount, and wherein determining whether to permit the transaction is based on the expected transaction volume and the payment amount.

20. The computer program product of claim 17, wherein the set of multiple transaction URLs include a return URL to which the consumer is to be directed upon completion of the transaction.

* * * * *